United States Patent [19]

Takeda

[11] Patent Number: 4,966,445

[45] Date of Patent: Oct. 30, 1990

[54] OPTICAL DEVICE USING MAGNETIC THIN FILMS AND ELECTRIC FIELD MEANS

[75] Inventor: Tsuneharu Takeda, Tokyo, Japan

[73] Assignee: Casio Computer Co., Ltd., Tokyo, Japan

[21] Appl. No.: 406,681

[22] Filed: Sep. 13, 1989

[30] Foreign Application Priority Data

Sep. 16, 1988 [JP] Japan .................................. 63-229878

[51] Int. Cl.⁵ ................................................. G02F 1/09
[52] U.S. Cl. ..................................... 350/377; 350/386; 350/387
[58] Field of Search ................ 350/376, 377, 386, 387, 350/355, 356

[56] References Cited

U.S. PATENT DOCUMENTS

```
3,580,664   5/1971  Bongers et al. .
3,860,325   1/1975  Matsushita et al. ................... 350/378
4,544,239  10/1985  Shone et al. .
4,728,178   3/1988  Gualtieri et al. .
4,789,500  12/1988  Morimoto et al. .
4,826,295   5/1989  Burt ...................................... 350/386
```

FOREIGN PATENT DOCUMENTS

DE-A1-
3610473  10/1986  Fed. Rep. of Germany .

OTHER PUBLICATIONS

Von Molnar et al., "The Mott Mobility Edge and the Magnetic Polaron," in Localization and Metal-Insulator Transitions, ed. Fritzsche et al., Plenum Press, New York, 1985, pp. 183-199.

Thermal and Magnetic Properties of Degenerate Antiferromagnetic Semiconductors; Takeda; Journal of Magnetism and Magnetic Materials 5(1977); 305-324.

Fabrication of Transparent PLZT Ceramics with a High Transmittance and Their Application to Optical Light Shutter; Japanese Journal of Applied Physics, vol. 26 (1987); 126-128 Supplement 26-2; Hayashi et al.

Primary Examiner—Bruce Y. Arnold
Assistant Examiner—Martin Lerner
Attorney, Agent, or Firm—Frishauf, Holtz, Goodman & Woodward

[57] ABSTRACT

A magnetic apparatus includes a magnetic semiconductor thin film, a power source for generating an electric field, an electrode for supplying charge from the power source to the magnetic thin film, a polarizer for linearly polarizing light emitted on the magnetic semiconductor thin film in a specific direction, and an analyzer for transmitting polarized light when the polarized light upon transmission through the magnetic semiconductor thin film has a specific Faraday rotational angle. When the electric field is applied to the magnetic semiconductor thin film, the magnetic order-disorder transition temperature of the film is changed to change a Faraday rotational angle. The light is transmitted through or shielded by the analyzer in correspondence with the Faraday rotational angle.

17 Claims, 4 Drawing Sheets

OPTICAL DEVICE USING MAGNETIC THIN FILMS AND ELECTRIC FIELD MEANS

Background of the Invention

1. Field of the Invention

The present invention relates to a magnetic apparatus utilizing a change in polarizability accompanied by magnetic order-disorder transition of a magnetic thin film. The magnetic apparatus is applied as, for example, an optical shutter used in a display element.

2. Description of the Related Art

Known conventional optical shutters are a mechanical shutter, a liquid crystal shutter, and a ferroelectric shutter.

In the mechanical shutter, a light-shielding plate is mechanically actuated. The mechanical shutter has an advantage in perfect light shielding and is used for a camera or the like.

The liquid crystal shutter has an advantage in micropatterning and is used for a timepiece, an electronic calculator, a liquid crystal television display element, an optical printer recording head, and the like.

The ferroelectric shutter utilizes a light-transmitting property and a ferroelectric property of a ferroelectric element such as a PLZT. (K. Hayashi et at. Jpn. J. Appl. Phys. Suppl. No. 26-2 (1987) pp126 to 128.) The ferroelectric shutter has an advantage in a solidstate arrangement unlike in the liquid crystal shutter, and can be used as a shutter for a large area device.

These conventional shutters, however, have the following disadvantages.

As for the mechanical shutter, it is difficult to micropattern it. In addition, the mechanical shutter cannot be used in applications which require high-speed operations since its maximum shutter speed is only about 1 msec.

As for the liquid crystal shutter, it is difficult to obtain a large-area shutter. In addition, since the liquid crystal shutter utilizes motion of liquid crystal molecules, a maximum shutter speed is about 10 $\mu$sec.

As for the ferroelectric shutter, it is not suitable for micropatterning since an electric field must be applied in a direction parallel to a surface of a ferroelectric thin film. Since crystal deformation is required to generate an electric dipole moment, a maximum shutter speed of the ferroelectric shutter is about 100 nsec.

As described above, it is difficult for any conventional optical shutter to satisfy contradictory factors, i.e., high-speed operation, micropatterning, and a large area display.

Summary of the Invention

The present invention has been made in consideration of the above situation, and has as its object to provide a magnetic apparatus which can be used as a high-speed, micropatterned optical shutter of a large device area.

According to the present invention, there is provided a magnetic apparatus comprising a magnetic thin film, electric field applying means for changing a magnetic order-disorder transition temperature of the magnetic thin film upon application of an electric field to the magnetic thin film, and optical control means for changing light radiated on the magnetic thin film between a light-transmitting state and a light-shielding state in correspondence with a change in polarizability on the basis of a magnetooptical effect accompanied by a change in magnetic order-disorder transition temperature of the magnetic thin film upon application of the electric field on the magnetic thin film.

According to the present invention, when an electric field is applied to the magnetic thin film, and especially a magnetic semiconductor or magnetic semimetal thin film, the magnetic order-disorder transition temperature can be greatly changed. When the magnetic thin film is irradiated with light, the emitted light can be set in a light-transmitting or light-shielding state by the light control means in accordance with polarizability based on the magnetooptical effect of the magnetic thin film. Upon application of the electric field to the magnetic thin film, the polarizability of the magnetic thin film is changed and the magnetic order-disorder transition temperature is raised above, and lowered below, the operating temperature, thereby selectively transmitting or shielding light and hence allowing application of the magnetic apparatus to an optical shutter. Since this apparatus utilizes the magnetooptical effect, a 1-nsec high-speed operation can be performed. In addition, since the thin film is utilized, micropattering can be achieved and a large area device can also be obtained.

Detailed Description of the Preferred Embodiments

Figure 1A:
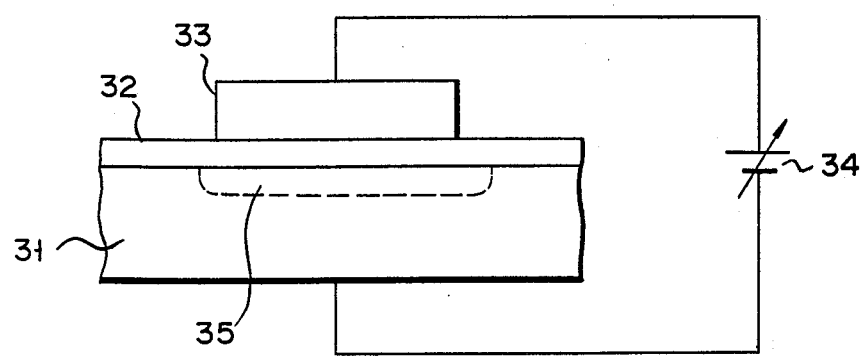
FIG. 1A is a view showing a state wherein an electric field is applied to a magnetic semiconductor.

The present invention will be described in detail hereinafter.

A magnetical order-disorder transition temperature of a magnetic body is changed by an electron density (ed. Fritzsche & Adler: Localization and Metal-Insulator Transition, Pleum Press (1985), p. 183, T. Takeda: J. Mag. Mag. Mater. 5 (1977) 315).

The electron densities in a semiconductor and in a semimetal are smaller than that in a metal.

Therefore, upon application of an electric field, the electron density of such a semiconductor or semimetal can be easily changed. Upon application of an electric field to a magnetic semiconductor or semimetallic magnet, its magnetic order-disorder transition temperature (e.g., a Curie temperature TC of a ferro-magnet or a Neel temperature $T_N$ of an anti-ferromagent) can be easily changed.

Polarizability of the magnet from a magnetooptical effect, for example, a Faraday rotational angle or Kerr rotational angle, is substantially zero at a temperature higher than the magnetic order-disorder transition temperature of the magnetic body and becomes a large value at a temperature lower than the magnetic order-disorder transition temperature. When the magnetic order-disorder transition temperature of a magnet, particularly of a magnetic semiconductor or of a magnetic semi-metal is raised above (or lowered below) an operating temperature, the Faraday or Kerr rotational angle is changed between zero and a finite value. Therefore, light incident from the optical control means such as a polarizer or analyzer onto a magnetic thin film can be transmitted or shielded in accordance with polarizability.

In this case, the magnetic order-disorder transition temperature during application of an electric field on the magnet preferably falls within the range of operating temperatures of an element. With this arrangement, the magnetic apparatus can serve as a shutter upon only an ON/OFF operation of the electric field. The operating temperature of the apparatus is generally set near room temperature, so the magnetic order-disorder transition temperature, i.e., $T_C$ or $T_N$ are preferably set near room temperature.

The principle of the operation described above will be described in more detail with reference to a magnetic semiconductor and a magnetic semimetal.

Examples of the magnetic semiconductor are a rare earth chalcogenide (e.g., chalcogenide of Europium ($^{63}$Eu)), spinel (e.g., chromium spinel $CdCr_2Se_4$), and a diluted magnetic semiconductor (e.g., $Cd_{1-x}Mn_xTe$). These magnetic semiconductors have magnetic moments localized at lattice points (e.g., a moment corresponding to a $^8S_{7/2}$ state in the chalcogenide of Europium ($^{63}$Eu)). The interaction between the local magnetic moments determines the magnetic properties of ferromagnets and/or anti-ferromagnets including the magnetic order-disorder transition temperature. Conduction electrons are present in the conduction band of a magnetic semiconductor containing an impurity or lattice defects. These conduction electrons influence the magnetic order of the magnetic semiconductor due to the following reasons.

(1) The interaction between the local magnetic moments is enhanced due to the presence of conduction electrons (an increase with an increase in electron density of the magnetic order-disorder transition temperature).

(2) The effect of interaction between the conduction electron spins and the local magnetic moments on the localized magnetic moments is equivalent to that of an external magnetic field on a local moment system. The local moments are aligned by the interaction in the same manner as in the case wherein an external magnetic field is applied to the magnetic semiconductor.

(3) The interaction in the phenomenon (2) effectively supplies negative potential to the conduction electrons. When a magnetical order is present, the energy of the conduction electron system is lowered.

Since phenomena (1) to (3) occur self-consistententy, a magnetic order state is determined to minimize the free energy of the entire system. The magnetic order-disorder transition temperature of the system is uniquely determined with respect to the conduction electron density. Therefore, when an electric field i applied to change the conduction electron density, the magnetic order-disorder transition temperature can be changed.

A magnetic semiconductor generally has a high polarizability level in the magnetic order state (e.g., a Faraday rotational angle of the uropium chalcogenide is $4.5 \times 10^5$ deg/cm) and becomes zero in the magnetic disorder state. That is, the polarizability greatly changes with respect to the magnetic order-disorder transition temperature.

The magnetic apparatus is operated as an optical shutter by operations (A) or (B).

(A) A region of a high conduction electron density is formed in a magnetic semiconductor (this region corresponds to an n-type region of a normal semiconductor). A magnetic order-disorder transition temperature in this region is high, and local magnetic moments are aligned. The region is set in the order state. In this state, an external electric field is applied to the magnetic semiconductor to reduce the conduction electron density (i.e., corresponding to formation of a depletion layer in a normal semiconductor). In this state, the magnetic order-disorder transition temperature is lowered, and the local magnetic moments can be changed from an order state into a disorder state at an operating temperature of an element, thereby greatly changing polarizability.

(B) The magnetic semiconductor is set at a temperature slightly higher than the magnetic order-disorder transition temperature (e.g., a temperature higher than the transition temperature by about 10%) to obtain a magnetic disorder state. An external electric field is applied to form a region of a high conduction electron density (corresponding to a accumulation layer in a normal semiconductor). The magnetic order-disorder transition temperature in this region is increased thereby obtaining a magnetic order state and generating polarizability.

In operations (A) and (B), light is shielded (or transmitted) in a state of "0" polarizability, and light is transmitted (or shielded) in a state with a finite polarizability, by means of a polarizer and an analyzer. Therefore, the magnetic apparatus of the present invention serves as a shutter.

Figure 1B:
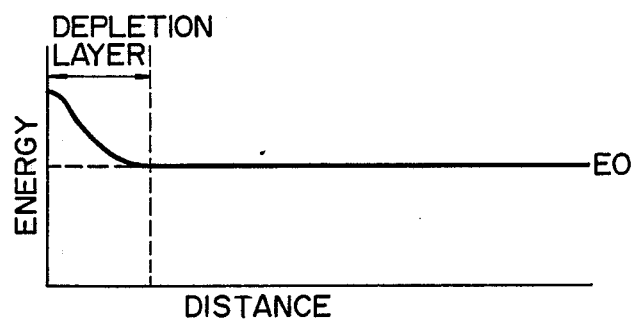
FIGS. 1B and 1C are views showing energy states of a magnetic semiconductor when an electric field is applied to the magnetic semiconductor.
Figure 1C:
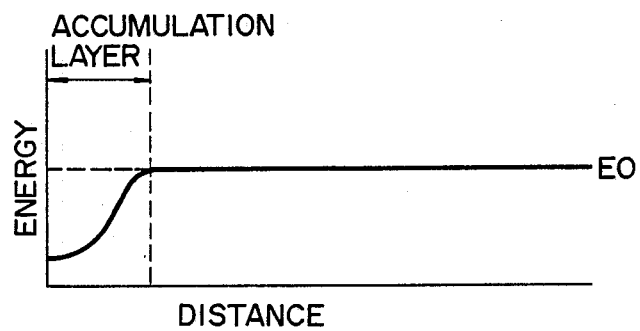

Changes in electron density corresponding to operations (A) and (B) are illustrated with reference to FIGS. 1A to 1C. FIG. 1A is a view showing a state wherein an electric field is applied to a magnetic semiconductor. An electric field can be applied from a power source 34 to an element having an electrode 33 formed on a magnetic semiconductor 31 through an insulating layer 32.

In order to achieve the operation (A), the magnetic semiconductor 31 is set in the order state while an electric field is not applied. The electrode 33 is then set in a negative state, and an electric field is applied to the magnetic semiconductor. An electron density in a region 35 adjacent to the insulating layer of the magnetic semiconductor 31 is decreased. The region 35 corresponds to a depletion layer in a normal semiconductor. In this case, as shown in FIG. 1B, bottom energy of the conduction band in the region 35 upon application of an electric field is higher than bottom energy $E_0$ of the conduction band obtained without applying the electric field. The portion of the region 35 is changed from the magnetic order state to the magnetic disorder state upon application of the electric field.

In order to achieve the operation (B), the magnetic semiconductor is set in a magnetic disorder state while an electric field is not applied. The electrode 33 is set in a positive state, and an electric field is applied to the magnetic semiconductor 31. The electron density of the portion of the region 35 is increased, and the region 35 corresponds to a accumulation layer in the normal semiconductor. In this case, as shown in FIG. 1C, the bottom energy of the conduction band in the region 35 upon application of an electric field is lower than the bottom energy $E_0$ of the conduction band obtained without applying an electric field. The portion of the region 35 is changed from the magnetic order state to the disorder state upon application of an electric field.

In a magnetic semimetal, the band gap between the conduction band and the valence band is of a negative value or of very small positive value. The presence of a finite number of conduction electrons is assumed even at the absolute zero temperature. Examples of this semimetallic magnet are $Gd_4Sb_3$, $Gd_5Sb_3$, and $Gd_4Bi_3$. These materials are ferromagnets with magnetic moments localized at lattice points, and their curie temperatures $T_C$ are near room temperature (i.e., about 260K for $Gd_4Sb_3$ and $Gd_5Sb_3$ and about 340K for $Gd_4Bi_3$).

GdSb or GdBi as a semimetallic alloys are an antiferromagnetis with a low $T_N$ of about 10K. This indicates that the magnetic order-disorder transition temperature radically changes in accordance with a value x of $Gd_xSb$ ($1 \leq X \leq 5/3$) or $Gd_xBi$ ($1 \leq X \leq 4/3$). The value x simply related to the conduction electron density. That is, the conduction electron density is decreased with a decrease in x. Values of electronegativeities of Gd, Sb, and Bi are 1.1, 1.9, and 1.9, respectively. In the above alloy, Gd is slightly cationic, and Sb and Bi are slightly anionic. Although this alloy is said to be semimetallic, it has semiconducting properties unlike a semimetal of simple substance. In addition, in the above semimetallic magnetic alloy, particularly, in $Gd_xSb$ (x=4/3 or 5/3) and $Gd_xBi$ (x=4/3), vacancies tend to be formed, and the charge neutrality can be locally distorted. Therefore, spatial fluctuations of the electron density are increased. In this state, when an external electric field is applied to the alloy, the local electron density can be greatly changed from the stable state.

Since the magnetic properties and the magnetic order-disorder transition temperature of a specific system are uniquely determined in its stable state, the magnetic order-disorder transition temperature depending on the electron density can be greatly changed upon application of an external electric field. The polarizability of such a system, e.g., Faraday rotational angle, is as large as about $10^5$ deg/cm at a temperature lower than the magnetic order-disorder transition temperature, and becomes almost zero at a temperature higher than the magnetic order-disorder transition temperature. Therefore, when the magnetic order-disorder transition temperature is raised above, or lowered below, the operating temperature, the magnetic apparatus can serve as an optical shutter, as previously described.

Figure 2:
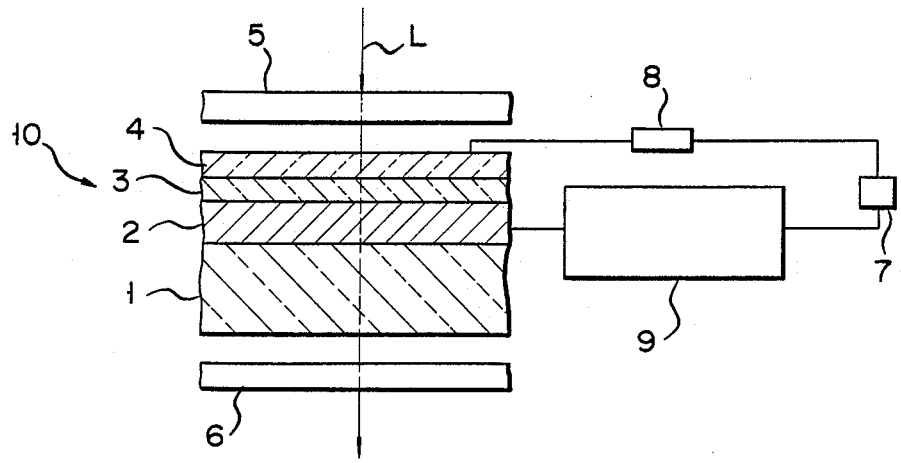
FIG. 2 is a schematic diagram showing an optical shutter utilizing a magnetic apparatus according to the present invention.

An embodiments of a magnetic apparatus according to the present invention will be described below. FIG. 2 is a schematic view showing an optical shutter which employs the magnetic apparatus of the present invention. Reference numeral 10 in FIG. 2 denotes a thin film element. The thin film element 10 comprises a magnetic thin film 2, a transparent insulating layer 3, and a transparent electrode 4, all of which are sequentially stacked on a transparent substrate 1. The respective layers of the thin film element 10 are formed by a conventional thin film technique such as sputtering.

The magnetic thin film 2 is made of a magnetic semiconductor or of a magnetic semimetal. An electric field is applied from a power source 7 to the magnetic thin film 2 through the electrode 4. A switch 8 is arranged between the electrode 4 and the power source 7 to ON/OFF-control the power source 7. When the thin film 2 consists of a magnetic semiconductor, a depletion or an accumulation layer is formed immediately below the electrode 4 upon application of the electric field, thereby obtaining the same structure as that of a MIS semiconductor.

An electron density control member 9 consisting of a conductor of a large volume may be connected between the power source 7 and the magnetic thin film 2 as needed. The electron density control member 9 is used to guarantee electrical neutrality of the entire system, thereby controlling the electron density of the magnetic thin film 2. That is, the electron density control member 9 has a function for supplying a large number of electrons to the thin film 2 or extracting a large number of electrons therefrom. The depletion or accumulation layer can be expanded to increase polarizability by the electron density control member 9. Therefore, the electron density control member 9 is effective especially when the thin film 2 is made of a magnetic semiconductor.

A polarizer 5 and an analyzer 6 are arranged above and below the thin film element 10, respectively. The polarizer 5 has a function for linearly polarizing irradiated-light L in a specific direction. The analyzer 6 has a function for transmitting specific linearly polarized light. The analyzer 6 transmits linearly polarized light corresponding to polarizability when the thin film 2 is set at a temperature lower than the magnetic order-disorder transition temperature, and shields other light components. That is, the polarizer 5 and the analyzer 6 serve as an optical control apparatus for selectively transmitting and shielding light. When a semiconductor laser oscillator is used as a light source for emitting the light L, it is possible to emit light polarized in the specific direction. In this case, the polarizer can be omitted.

In the magnetic apparatus having the above arrangement, the light L is vertically radiated from a light source (not shown) onto the surface of the thin film element 10. This light L is radiated on the magnetic thin film 2 through the electrode 4 and the insulating layer 3. When the temperature of the thin film 2 is lower than the magnetic order-disorder transition temperature, the light L is rotary-polarized through a predetermined angle in accordance with polarizability on the basis of the Faraday effect. When the temperature of the thin film 2 exceeds the magnetic order-disorder transition temperature, rotary polarization does not occur. The polarizability is adjusted such that an electric field is applied to or withdrawn from the magnetic thin film 2 upon ON/OFF operation of the power source 7 by the switch 8 to control the magnetic order-disorder transition temperature of the magnetic thin film 2. In this manner, the light L transmitted through the magnetic thin film 2 reaches the analyzer 6 through the substrate 1. For example, when only rotary-polarized light is transmitted through the analyzer 6, the light L can be transmitted or shielded, thereby using the magnetic apparatus as an optical shutter.

Figure 3:
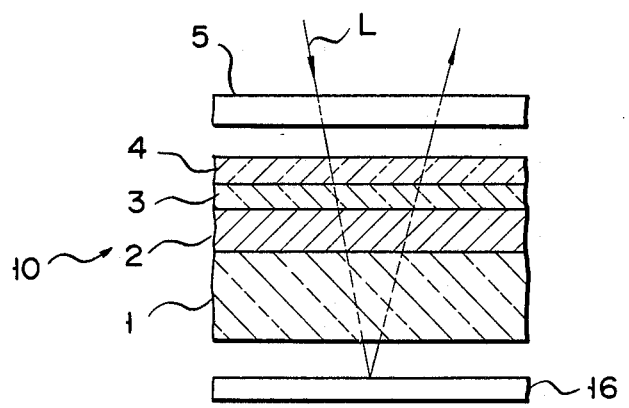
FIGS. 3 to 6 are views showing modifications of the magnetic apparatus.

As shown in FIG. 3, a reflecting member 16 can be formed at the position of the analyzer 6 in FIG. 2. In this case, after the light L is transmitted through the polarizer 5 and then the thin film element 10, the light L is reflected by the reflecting member 16 and then transmitted through the thin film 10 again. When the light L is not rotary-polarized, the light L is transmitted through the polarizer 5. Otherwise, the light L is shielded by the polarizer 5. With the above arrangement, the Faraday rotational angle can be increased, thus advantageously increasing an ON/OFF ratio.

Figure 4:
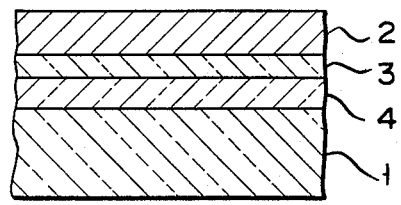
Figure 5:
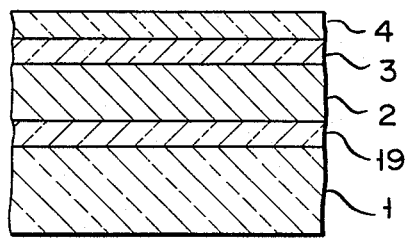

As shown in FIG. 4, the electrode 4 and the magnetic thin film 2 may be reversed in order. In addition, as shown in FIG. 5, electron supply member 19 made of a transparent thin film may be arranged adjacent to the magnetic thin film 2.

Figure 6:
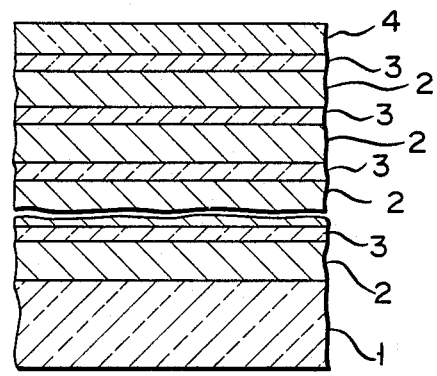
Figure 7:
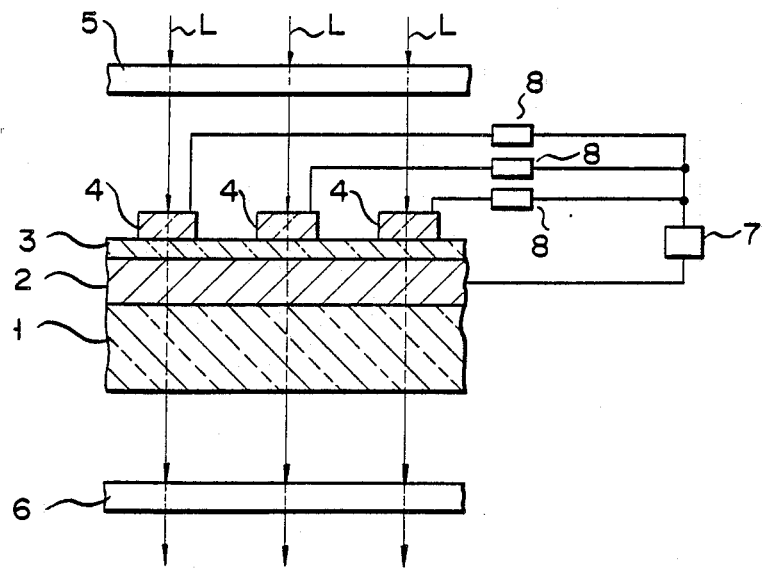
FIG. 7 is a schematic view showing a display element utilizing the optical shutter shown in FIG. 2.

When the magnetic thin film 2 is made of a magnetic semimetal, the transmittance of this material is relatively low. Therefore, in order to obtain a high ON-/OFF ratio as a shutter, the magnetic thin films 2 and the insulating layers 3 may be alternately stacked, as shown in FIG. 6, thereby increasing the transmittance by multiple reflection of light.

When the magnetic apparatus described above is used as a display element, a plurality of electrodes 4 are arranged, and each electrode is ON/OFF-controlled by a corresponding switch 8.

Figure 8:
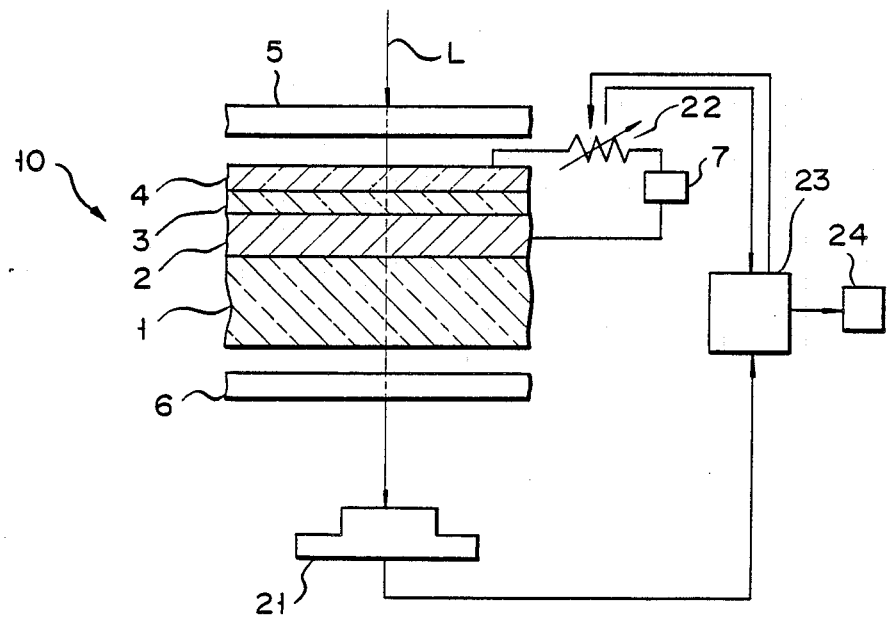
FIG. 8 is a schematic view showing a variable temperature detecting apparatus utilizing the magnetic apparatus of the present invention.

The magnetic apparatus according to the present invention can also be utilized as a variable temperature detection apparatus. FIG. 8 shows a schematic arrangement showing a variable temperature detection apparatus which utilizes the magnetic apparatus of the present invention. The same reference numerals as in FIG. 2 denote the same parts in FIG. 8, and a detailed description thereof will be omitted. A variable resistor 22 is arranged between an electrode 4 and a power source 7. An electric field applied to the thin film 2 is continuously changed. Reference numeral 21 denotes a photodetector. The photodetector 21 detects whether light L passes through an analyzer 6. A detection signal from the photodetector 21 is output to a controller 23. As described above, whether or not the light L passes through the analyzer 6 is determined in accordance with whether or not a magnetic thin film 2 has polarizability. This is further determined in accordance with whether the temperature of the thin film is higher or lower than the magnetic order-disorder transition temperature. Therefore, when the photodetector 21 detects light, i.e., when the temperature of the thin film is lower than the order-disorder transition temperature, a signal is output from the controller 23 to the variable resistor 22 to adjust the resistance for decreasing the magnetic order-disorder transition temperature of the thin film 2. This adjustment continues until light no longer passes through the analyzer 6. However, when the photodetector 21 does not detect light, the resistance of the variable resistor 22 is controlled to increase the magnetic order-disorder transition temperature. In this manner, when the magnetic order-disorder transition temperature of the magnetic thin film 2 is controlled, this temperature corresponds to the temperature of the thin film 2. Therefore, a signal from the variable resistor 22 is output to the controller 23, and the magnetical order-disorder transition temperature is calculated on the basis of the signal value. The calculated temperature is then displayed on a display unit 24.

This embodiment exemplifies a transmission magnetic apparatus which utilizes Faraday rotation. However, the present invention is applicable to a reflection magnetic apparatus which utilizes Kerr rotation.

When the polarizer and the analyzer are omitted from the magnetic apparatus, the resultant structure can also be utilized as a magnetic memory.

As described above, since the optical shutter using the magnetic apparatus of the present invention utilizes the magnetooptical effect, 1-nsec high-speed operations can be achieved. In addition, since the thin film is used, micropatterning can be achieved and a large area can be obtained.

What is claimed is:

1. A magnetic apparatus comprising:
   a magnetic thin film;
   electric field applying means for changing a magnetic order-disorder transition temperature of said magnetic thin film upon application of an electric field to said magnetic thin film; and
   optical control means for changing light radiated on said magnetic thin film between a light-transmitting state and a light-shielding state in correspondence with a change in polarizability on the basis of a magnetooptical effect accompanied by a change in magnetic order-disorder transition temperature of said magnetic thin film upon application of the electric field on said magnetic thin film.

2. An apparatus according to claim 1, wherein said magnetic thin film has the magnetic order-disorder transition temperature at an operating temperature of said apparatus when an electric field is not applied to said magnetic thin film.

3. An apparatus according to claim 1, wherein said magnetic thin film contains a magnetic semiconductor.

4. An apparatus according to claim 3, wherein said magnetic semiconductor contains a material selected from the group consisting of a chalcogenide of a rare-earth element, spinel, and a diluted magnetic semiconductor.

5. An apparatus according to claim 1, wherein said magnetic thin film contains a magnetic semimetal.

6. An apparatus according to claim 5, wherein said magnetic semimetal contains a material selected from the group consisting of $Gd_4Sb_3$, $Gd_5Sb_3$, and $Gd_4Bi_3$.

7. An apparatus according to claim 1, wherein said optical control means comprises a polarizer for linearly polarizing light emitted toward said magnetic thin film in a specific direction, and an analyzer for transmitting polarized light transmitted through or reflected by said magnetic thin film when the polarized light has a polarizing plane with a specific rotational angle.

8. An apparatus according to claim 1, wherein said electric field applying means comprises a power source for generating the electric field and an electrode for supplying charge from said power source to said magnetic thin film.

9. An apparatus according to claim 8, further comprising an electron density control member for controlling an electron density of said magnetic apparatus.

10. An apparatus according to claim 1, wherein said electron density control member contains a conductor.

11. An apparatus according to claim 10, wherein said electron density control member is arranged between said magnetic thin film and said power source.

12. An apparatus according to claim 10, wherein said electron density control member is arranged adjacent to said magnetic thin film.

13. An apparatus according to claim 1, wherein said optical control means comprises a polarizer for linearly polarizing light emitted onto said magnetic thin film in a specific direction, and a reflecting member for reflecting polarized light upon transmission through said magnetic thin film and guiding the polarized light again to said polarizer.

14. A magnetic apparatus comprising:
   a magnetic element obtained by alternately stacking magnetic thin films and insulating layers;
   electric field applying means for applying an electric field to said magnetic thin films to change a magnetic order-disorder transition temperature thereof; and optical control means for changing the light radiated on said magnetic thin films between a light-transmitting state and a light-shielding state in correspondence with a change in polarizability based on a magnetooptical effect caused by a change in magnetic order-disorder transition temperature of said magnet thin films upon application of the electric field to said magnetic thin films.

15. An optical shutter comprising:
a magnetic element having a substrate and a magnetic thin film;
an electrode, formed on said magnetic thin film through an insulating layer, for supplying charge to said magnetic thin film;
a power source for applying an electric field to said electrode; and
optical control means for changing light radiated on said magnetic thin film between a light-transmitting state and a light-shielding state in correspondence with a change in polarizability on the basis of a magnetooptical effect accompanied by a change in magnetic order-disorder transition temperature of said magnetic thin film upon application of the electric field to said magnetic thin film.

16. A display apparatus comprising:
a magnetic element having a substrate and a magnetic. thin film;
a plurality of electrodes, formed on said magnetic thin film through insulating layer, for supplying charge to said magnetic thin film;
power source means for applying an electric field to said electrodes;
switching means for ON/OFF-controlling the electric field applied from said power source means to each of said electrodes; and
optical control means for changing the light radiated on said magnetic thin film between a light-transmitting state and a light-shielding state in correspondence with a change in polarizability based on a magnetooptical effect caused by a change in magnetic order-disorder transition temperature of said magnetic thin film upon application of an electric field to said magnetic thin film.

17. A variable temperature detection apparatus comprising:
a magnetic element having a substrate and a magnetic thin film;
an electrode, formed on said magnetic thin film through an insulating layer, for supplying charge to said magnetic thin film;
a power source for applying an electric field to said electrode;
adjusting means for adjusting a magnitude of the electric field from said power source;
optical control means for changing the light radiated on said magnetic thin film between a light-transmitting state and a light-shielding state in correspondence with a change in polarizability based on a magnetooptical effect caused by a change in magnetic order-disorder transition temperature of said magnetic thin film upon application of an electric field to said magnetic thin film;
detecting means for detecting presence/absence of light transmission;
control means for outputting a control signal for adjusting the magnitude of the electric field to said adjusting means until the light transmission is not detected when said detecting means detects the light transmission or until the light transmission is detected when said detecting means does not detect the light transmission; and
temperature calculating means for calculating a temperature from an adjustment amount of the electric field of said adjusting means on the basis of the control signal from said control means.

* * * * *